United States Patent [19]

Varon et al.

[11] 4,244,763

[45] Jan. 13, 1981

[54] METHOD OF APPLYING A LABEL TO AN OBJECT

[75] Inventors: Miquel A. Varon, Upland; Paul F. Paddock, Riverside, both of Calif.

[73] Assignee: Sunkist Growers, Inc., Sherman Oaks, Calif.

[21] Appl. No.: 934,873

[22] Filed: Aug. 18, 1978

Related U.S. Application Data

[62] Division of Ser. No. 776,319, Mar. 10, 1977, Pat. No. 4,123,310.

[51] Int. Cl.[3] ............................................ B32B 31/16

[52] U.S. Cl. ....................................... 156/74; 40/2 R; 156/209; 156/214; 156/219; 156/344

[58] Field of Search ................. 156/344, 74, 209, 212, 156/214, 219, 257, 351, 361, 445, 488, 494, 495, 540–542, 566, 568, 582, 584, DIG. 33, 40, 46, 183, 196, 211; 40/310, 327, 2 R, 26

[56] References Cited

U.S. PATENT DOCUMENTS

| | | | |
|---|---|---|---|
| 2,621,434 | 12/1952 | Jackson et al. | 156/542 |
| 3,231,448 | 1/1966 | Flood | 156/320 X |
| 3,365,344 | 1/1968 | Suvada | 156/209 X |
| 3,530,028 | 9/1970 | Messmer | 156/584 |
| 3,657,043 | 4/1972 | Ploetz | 156/196 |
| 3,729,362 | 4/1973 | French et al. | 156/542 |
| 3,817,827 | 6/1974 | Benz | 156/183 X |

OTHER PUBLICATIONS

Scotch Vacuum Wheel Applicator, P-1vwpsr, (97.2)R2, Jan. 11, 1977.

*Primary Examiner*—John T. Goolkasian
*Assistant Examiner*—Thomas Bokan
*Attorney, Agent, or Firm*—Paul A. Weilein

[57] ABSTRACT

Method for labeling objects including fruits supplied to a labeling station by an endless conveyor. Labels on a carrier tape are moved from a supply reel by a knurled roller which impresses a surface weakening pattern on each label so it will readily conform to a non-planar surface of the object. The tape is formed into a feed storage loop by an oscillatable tension regulating arm which controls actuation and deactuation of the knurled roller. An indexing tape segment passes through an indexing block in a transfer station, where each entering label is sensed by a detector. Indexing movement of the tape is initiated by an object detector on the conveyor. Indexing moves the tape around a sharp bend to strip the detected label from the tape and position it in a label holding frame. A label transfer wheel with peripheral suction cups is operated in timed relation to the detection of an object on the conveyor, to move a suction cup under the label in the holding frame, whereupon a vacuum is applied to grip the label and carry it to a position where it is pressed against a surface of the detected object, at which time the vacuum is released. A thin lip of the suction cup is deformed by the pressing action to vent the cup interior to atmosphere. A take-up storage loop is formed by a second oscillatable tension regulating arm which controls the intermittent actuation of a motor driven tape take-up reel.

7 Claims, 18 Drawing Figures

FIG. 2.
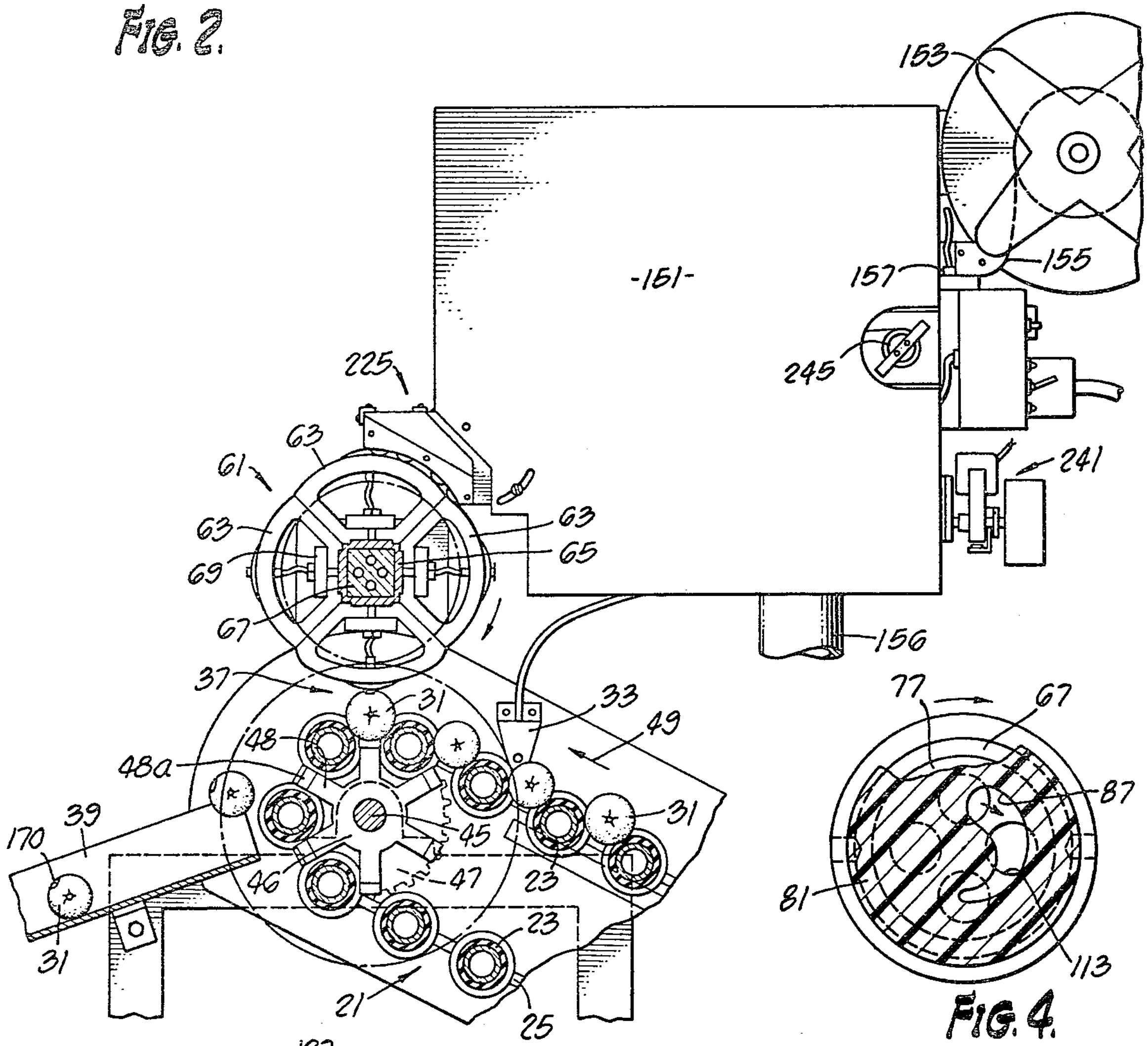
FIG. 4.
FIG. 3.
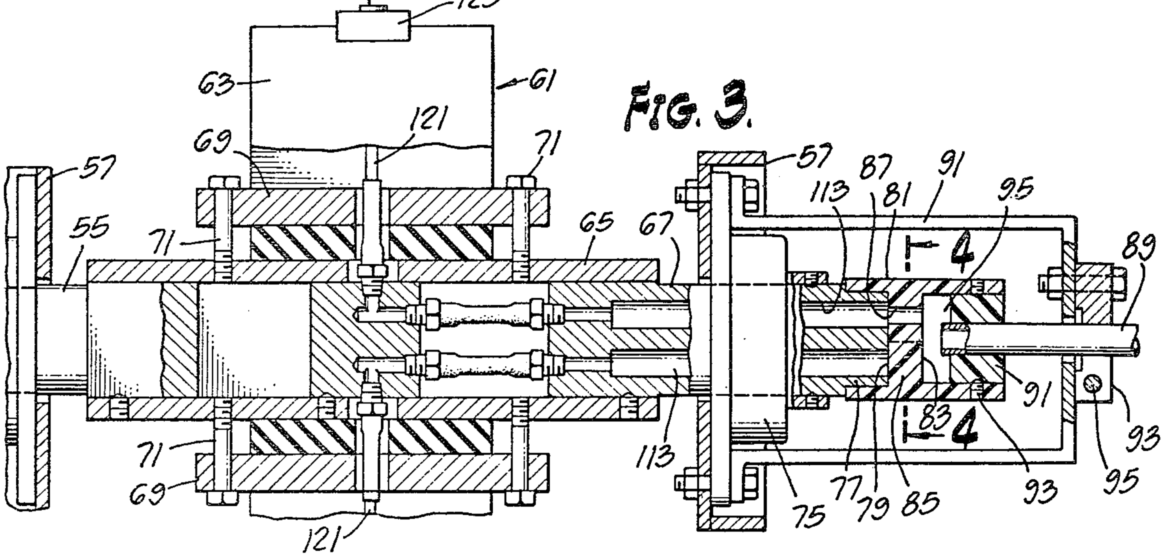

FIG. 6.
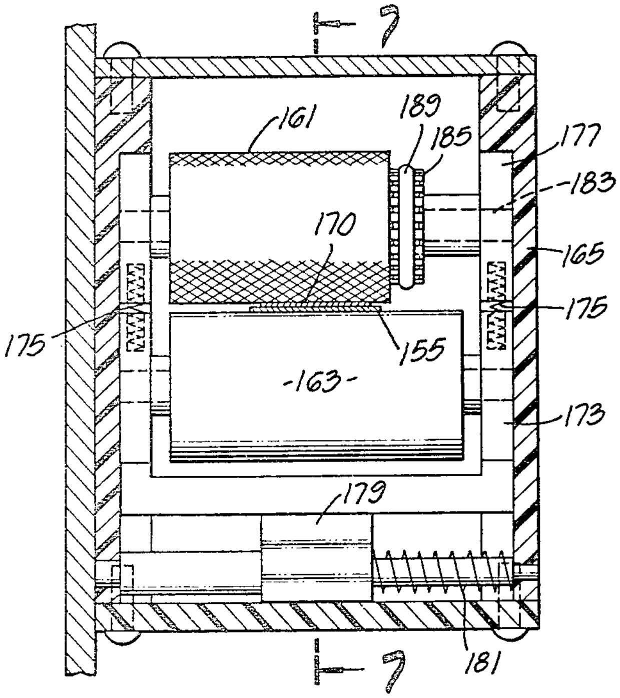
FIG. 7.
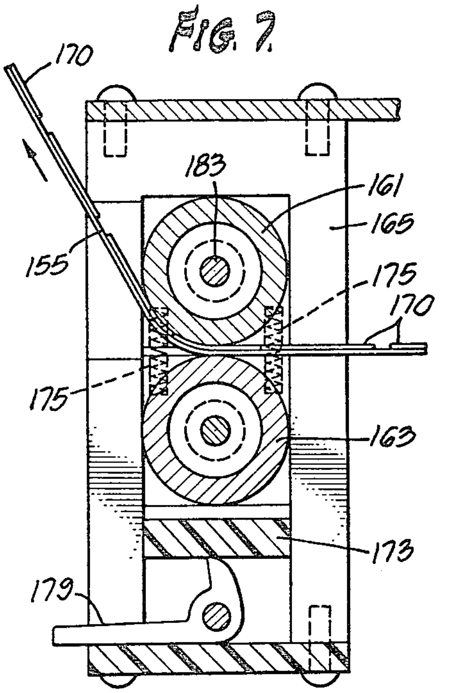
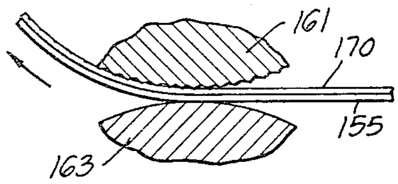
FIG. 8.
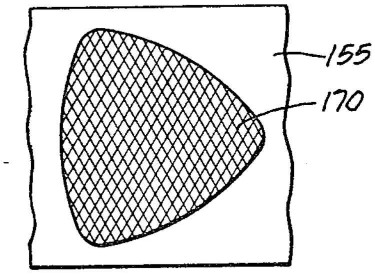
FIG. 9.
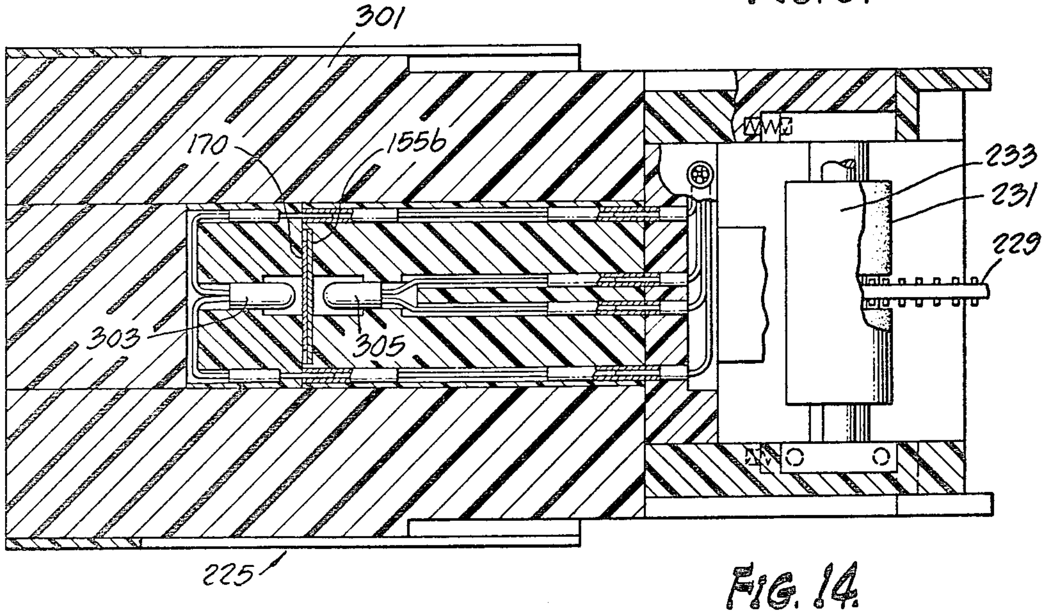
FIG. 14.

FIG. 10.
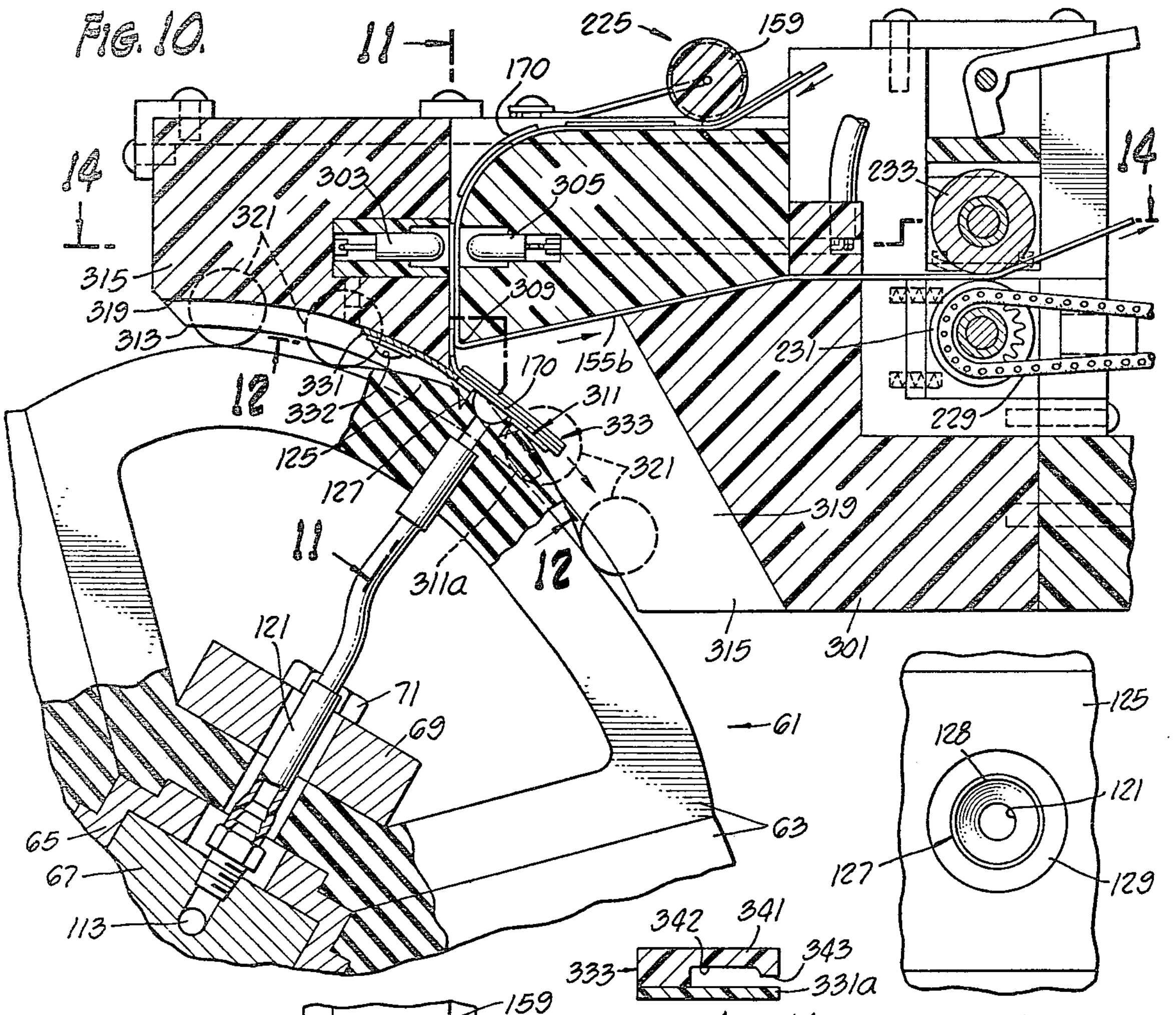
FIG. 11a
FIG. 13.
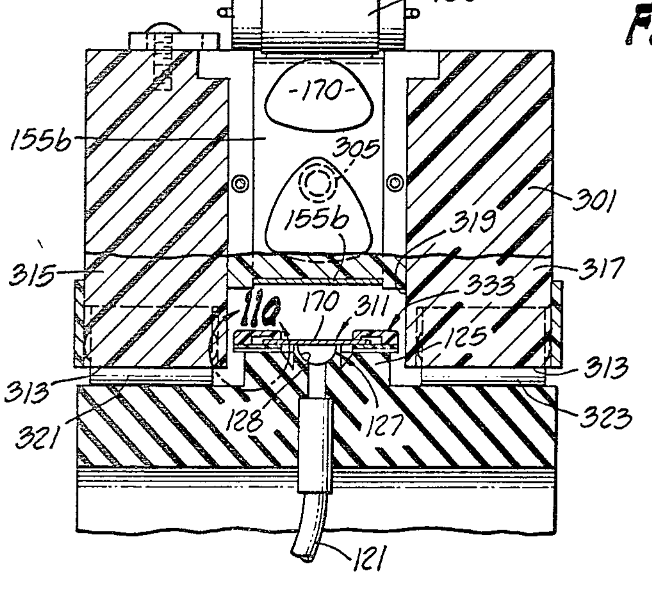
FIG. 11.
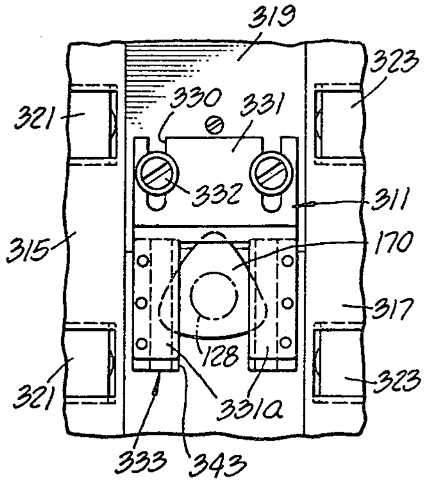
FIG. 12.

METHOD OF APPLYING A LABEL TO AN OBJECT

This is a division of application Ser. No. 776,319, filed Mar. 10, 1977 now U.S. Pat. No. 4,123,310.

BACKGROUND OF THE INVENTION

The present invention relates generally to the field of applying labels to fruits, vegetables, and other objects of varying size.

There has been a growing need in the packaging industry for machines which could successfully apply sophisticated and complex markings to fruit and other objects at relatively high operating speeds, and particularly indicia which might include a multiplicity of colors as well as printing and other markings of complex configuration.

Heretofore, quite a number of machines have been developed and are commercially available for successively printing trademark names, insignia, and other data on fruit, objects, flat containers, and the like, in a continuous operation. Such machines are disclosed, for example, in U.S. Pat. Nos. 2,971,459; 3,244,276; and 3,277,815. However, while the machines as disclosed in these patents operate satisfactorily for applying simple indicia, it is readily apparent that machines which utilize printing processes are not capable of applying the more sophisticated and complex markings.

It thus became apparent that the inherent disadvantages of the printing type machine might be solved by utilizing pre-printed labels having a pressure adhesive surface, and an examination of the prior art indicated that automatic labeling machines were already known and available for applying labels to fruits, vegetables and other objects, as exemplified by the machines disclosed in U.S. Pat. Nos. 2,065,957; 2,621,434; 3,405,021; 3,729,362; and 3,769,139. However, the known labeling machines, as disclosed in these patents, were found to embody mechanical structures which for one reason or another could not be depended upon to accurately apply the labels in a manner to be commercially feasible to high volume operations.

In addition to the apparatus disclosed and known from the above mentioned patents, other apparatus is generally known from a pamphlet (1 sheet) published by the Industrial Tape Division of the 3M Company, entitled "Scotch Vacuum Wheel Applicator", and identified at the bottom of the back page by number P-1VWPSR(97.2)R2. This pamphlet illustrates and describes an automatic taping head designed for the application of predetermined lengths of pressure-sensitive tapes at high rates of speed to a wide variety of products. The method contemplated by the present invention differs from that disclosed in this pamphlet in that separate labels are adhesively mounted on a carrier tape from which they are successively stripped or detached and then individually carried by vacuum cups on a transfer wheel, and applied to the objects.

SUMMARY OF THE INVENTION

The present invention relates more specifically to a method of applying adhesively pressure bonded labels in a continuous operation to fruits and other objects, and particularly to spheroidal surface areas, as well as other non-planar surfaces, at high operating speeds.

It is one object of the herein described invention to provide an improved method for automatically applying adhesively bonded labels to objects generally, and to fruits and the like in particular, which have a more or less rounded surface contour.

A further object resides in the provision of a method according to the foregoing object, which may be used with objects of varying sizes at relatively high operating speeds, and which will operate in a consistent and dependable manner.

A further object is to provide a method of successively applying labels to a series of objects as they are delivered to a labeling station, which comprises the steps of: successively delivering adherable labels detached from a carrier tape at spaced intervals to the labeling station; successively conveying objects to be labeled to the labeling station in synchronized timed relation to the delivery of the labels; and pneumatically gripping the detached labels one-by-one as they are delivered, and bodily moving them into surface engagement with the objects as they arrive at the labeling station.

Another object is to provide in a method for applying labels to objects, a unique step for impressing a non-adherent surface of the label with a surface tension relieving pattern so as to facilitate the conformance of the label to an object having a curved surface.

Still another object resides in an improved method of labeling an object, wherein the label is supplied from a carrier tape which is maintained under constant, low tension and low inertia conditions to enable high speed acceleration and deceleration during indexing movements, and wherein the labels are removed from the tape and pneumatically gripped by a suction force which is relieved when the label is applied to the object.

The mechanism for supplying the fruits or objects comprises a conveyor such as, for example, a conveyor of a type illustrated in U.S. Pat. No. 3,277,815 which operates to pre-orient the fruit as it approaches the labeling station.

The tape feeding mechanism is arranged to feed the label carrying tape into a constant tension storage feed loop which coacts with a constant tension take-up loop to create a central indexing loop having a low constant tension and substantially inertia free dynamic portion which may be rapidly accelerated at high speed during indexing operations of the tape, during which the tape is moved forwardly around a sharp bend to effect removal of a label and its deposit into a holding frame.

As the tape is fed into the feed storage loop, it passes over a knurled roller which impresses a pattern on the outer surface of each label that allows the label to more readily conform to curved surface portions of the fruit or object during its application thereto.

Indexing movements of the tape are controlled by detecting means which senses the arrival of objects on the conveyor at a predetermined position, and in order that appropriate labels will be moved into the holder only when there will be a sensed object arriving in the labeling section to receive the label.

A transfer wheel carries a plurality of suction cups which are supported on flexible sequential sections of the wheel and arranged to successively grippingly pick up the labels from the holder frame and transport them to and apply them to the fruit or objects as they arrive at the labeling station. The transfer wheel assembly embodies a valving mechanism which is arranged to connect a vacuum source with each suction cup as it picks up a label, and thereafter disconnect the vacuum as the label is being applied to the object or fruit.

Further objects and advantages of the invention will be brought out in the following part of the specification, wherein detailed description is for the purpose of fully disclosing the invention without placing limitations thereon.

BRIEF DESCRIPTION OF THE DRAWINGS

In the drawings, which are to be regarded as merely illustrative:

FIG. 2 is a fragmentary side elevational view, partly in section, as seen along the line 2—2 of FIG. 1;

FIG. 3 is a transverse sectional view, taken substantially on the line 3—3 of FIG. 1;

FIG. 4 is a fragmentary sectional view, taken substantially on line 4—4 of FIG. 3, and showing details of the vacuum control valve means;

FIG. 6 is a sectional view taken substantially on line 6—6 of FIG. 5, and showing details of the tape pinch roll drive and label knurling means;

FIG. 7 is a transverse sectional view through the drive and knurling means, taken substantially on line 7—7 of FIG. 6;

FIG. 8 is an enlarged fragmentary view diagrammatically illustrating the cooperative operation of the driving and knurling rollers for impressing the knurling pattern on a label carried by the tape;

FIG. 9 is a fragmentary plan view of an exemplary label, mounted on a carrying tape and knurled in such a manner that the printed surface of the tape is weakened but not torn;

FIG. 10 is an enlarged side, sectional view taken through the indexing block and showing the path of travel of the label-carrying tape therethrough;

FIG. 11 is a sectional view taken substantially on line 11—11 of FIG. 10, and showing the relationship of the indexing block and label transferring wheel;

Figures 15, 16:
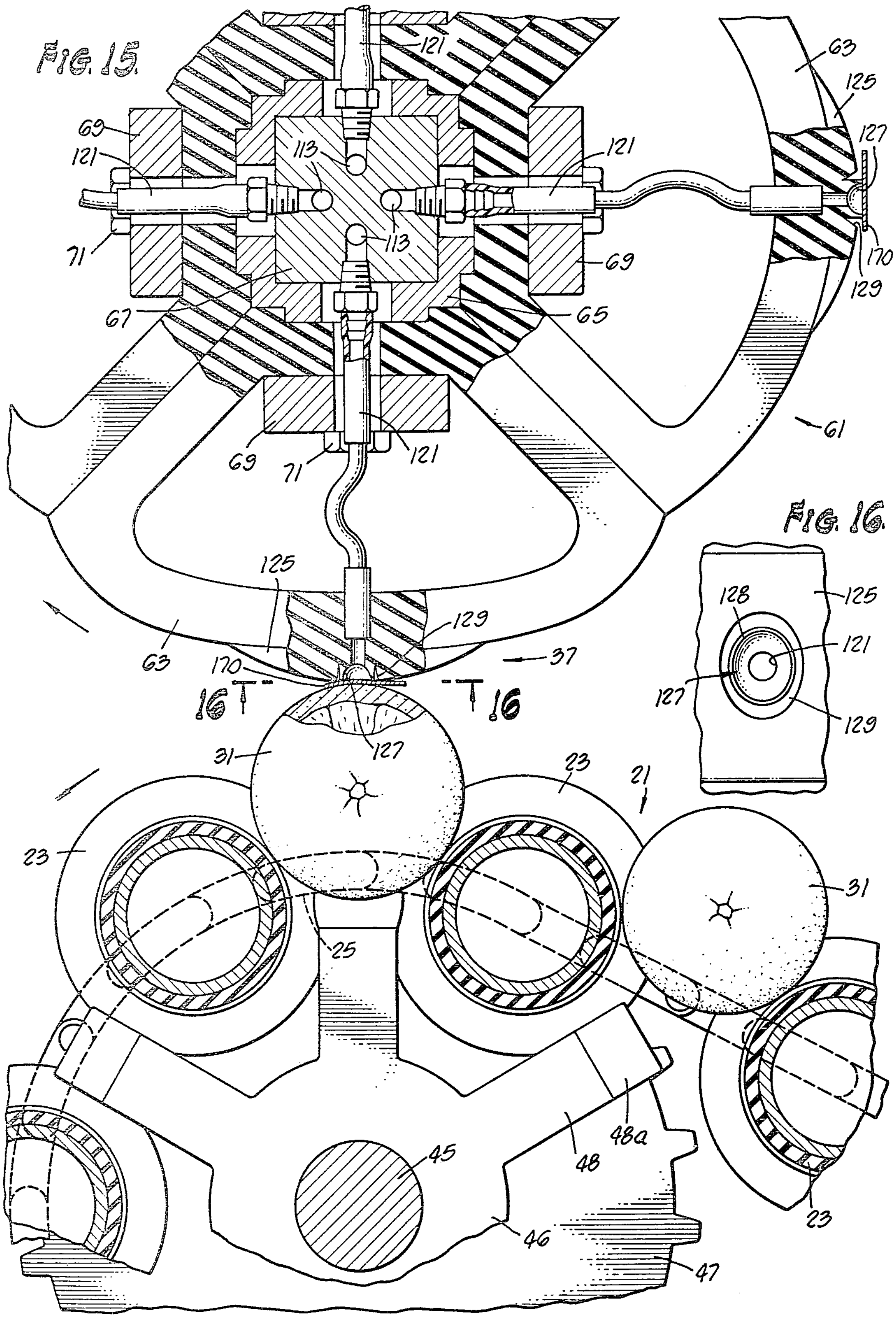
Figure 17:
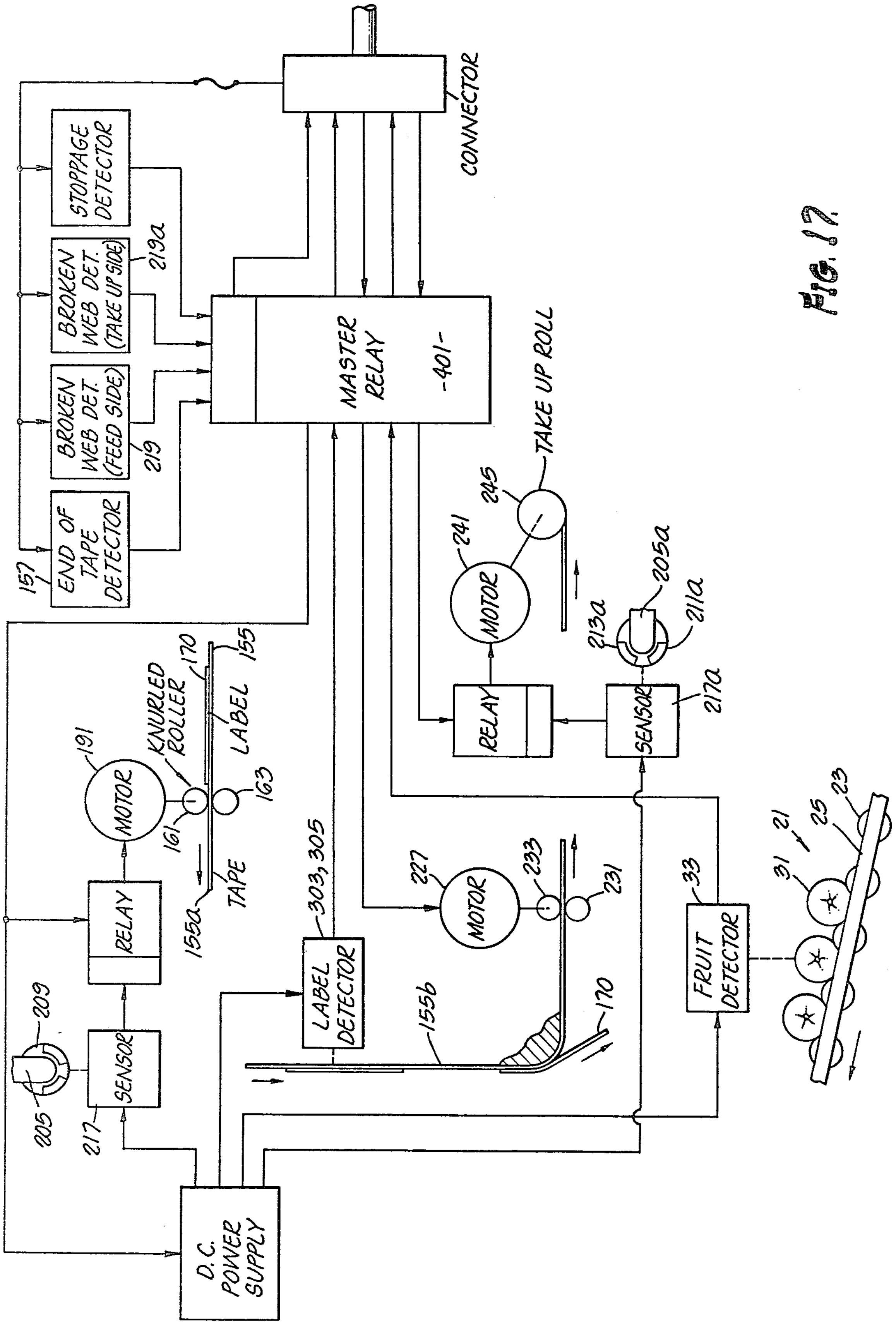

FIG. **11*a* is an enlargement of the sectional portion of the label holding frame, as indicated at 11*a* in FIG. 11**;

FIG. 12 is a fragmentary plan view illustrating the details of the mounting of the label holding frame on the indexing means, as seen along a line 12—12 of FIG. 10;

FIG. 13 is a fragmentary plan view of a suction cup and its surrounding surface at the periphery of the transfer wheel;

FIG. 14 is a transverse sectional view of the indexing block, taken substantially on line 14—14 of FIG. 10;

FIG. 15 is a greatly enlarged view, partly in section, and illustrating the operative relationship of the transfer wheel and the conveyor at the time a label is being applied to an object;

FIG. 16 is a view similar to that of FIG. 13, and illustrating the deformation of the transfer wheel and suction cup during the time the label is being applied to the object; and FIG. 17 is a schematic illustration of the operative components of the apparatus for carrying out the steps of the present invention and the means for controlling their operation.

DETAILED DESCRIPTION

Figure 1:
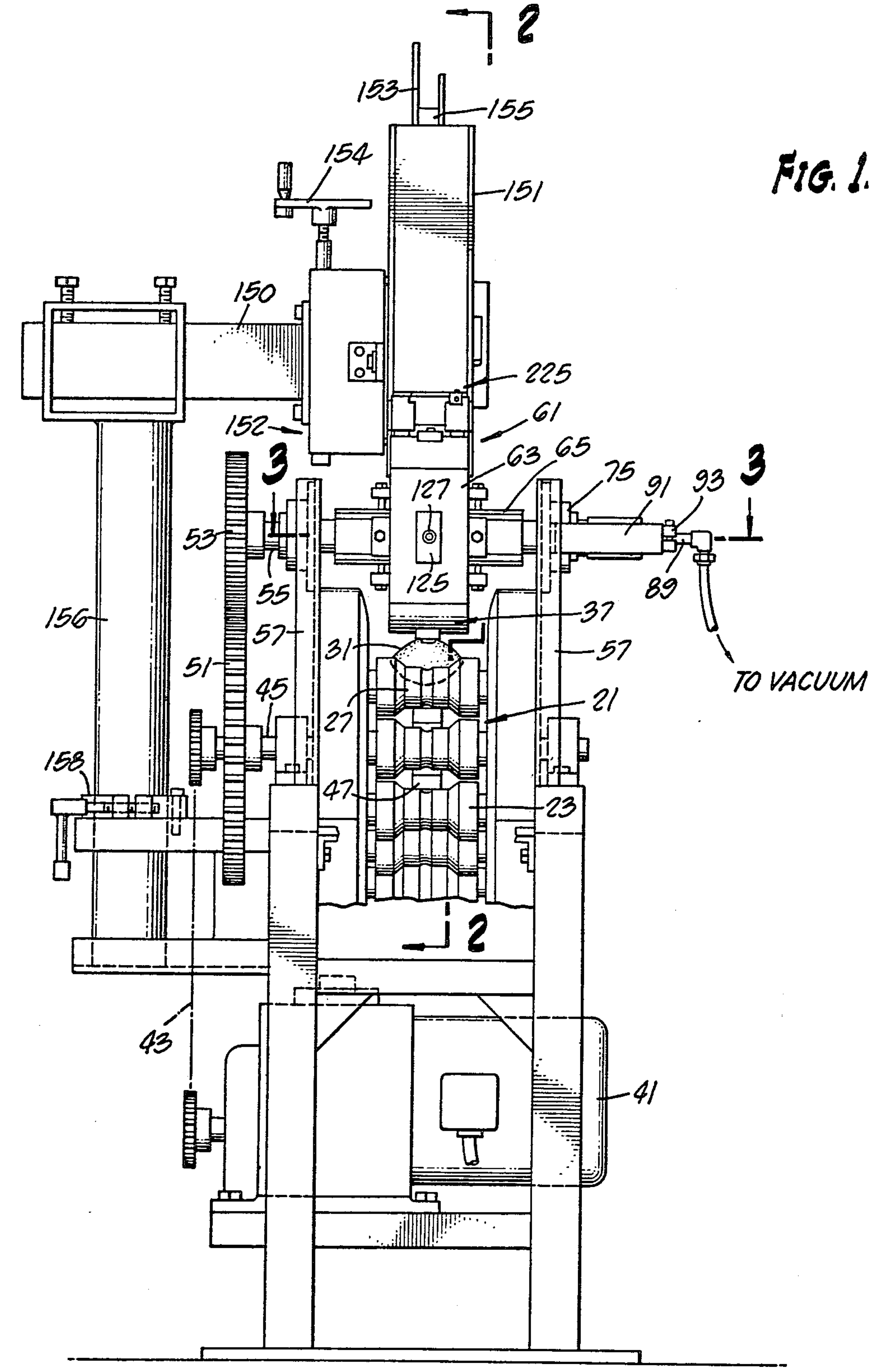
FIG. 1 is an elevational view of apparatus for practicing the present invention, as seen from an end thereof adjacent the labeling station.

Referring now to the drawings in greater detail, and more particularly to FIGS. 1, 2, and 15, there is shown a conveyor generally illustrated at 21 comprising a plurality of rollers 23 which are mounted to extend between a pair of spaced apart parallel chains 25 for translational movement. Although not illustrated in the drawings, the ends of the rollers are arranged to contact fixed support means so that, as the chains 25 move the rollers in translation, they are rotated by frictional contact with the fixed support.

As is particularly well illustrated in FIG. 1, the rollers are provided with sleeves or otherwise suitably shaped so as to form pockets 27 therebetween. An object 31, such as the illustrated orange to be labeled, is carried in the pocket formed by adjacent rollers. Thus, as has been shown in U.S. Pat. No. 2,971,459, the oranges will be rotated to correspondingly orient their longer axes due to the sinusoidal geometry of the pockets. As will be realized, the rotation of the oranges aids in the proper seating of a label thereon.

Of course, those skilled in the art will realize that, while the conveyor 21 illustrated in these drawings is the presently preferred structure, any suitable conveyor may be utilized and its choice may depend as much upon the type of object to be labeled, as any other factor.

A suitable fruit detector 33, as shown in FIG. 2, is mounted adjacent the conveyor so as to sense the presence of an orange or object in any particular pocket. At the present time, it is envisioned that the fruit detector may comprise an operatively associated suitable light emitter means and photo-electric detection means to sense the passage of an object either by causing the object to intercept a light beam between the emitter and the detection means, or to cause the object to reflect the light beam from the emitter toward the detection means. Regardless of the type of detection unit employed, those skilled in the art will realize that the objective here is merely the detection of the arrival of the object at a predetermined location in relation to a labeling station as generally indicated at 37.

When the labeled objects have passed the labeling station 37, the labeled objects may be discharged from the conveyor into a trough 39 or other desired handling device.

In the illustrated embodiment, the conveyor is arranged to be driven by a motor 41 (FIG. 1) acting through a chain or belt drive 43 to rotate a conveyor shaft 45 which carries a pair of chain driving sprockets 47 (FIG. 2) respectively engaged with the conveyor chains 25 to drive the conveyor in the direction indicated by the arrow 49 in FIG. 2. Also, securely mounted on the conveyor drive shaft 45 is a rotary platen 46 having spokes 48 which extend between adjacent rollers and assist in supporting the object during the application of the label. If desired, the end of each spoke may be provided with a tip **48*a*** of suitable resilient material to prevent injury to the object, when such object is a fruit such as an orange.

As shown in FIG. 1, there may also be fixedly mounted on the shaft 45 a gear 51 which is located in driving relationship with a gear 53 fixedly mounted on a shaft 55 in order that these shafts may be rotated in synchronism. Both shafts 45 and 55 are mounted for rotation in appropriate bearings mounted on frame members 57.

As best shown in FIGS. 2, 10, and 15, a label transfer wheel 61 is mounted on the shaft 55 for rotation therewith, and comprises a plurality of segmental sections 63 which are constructed of a relatively flexible or pliable material.

Figure 5:
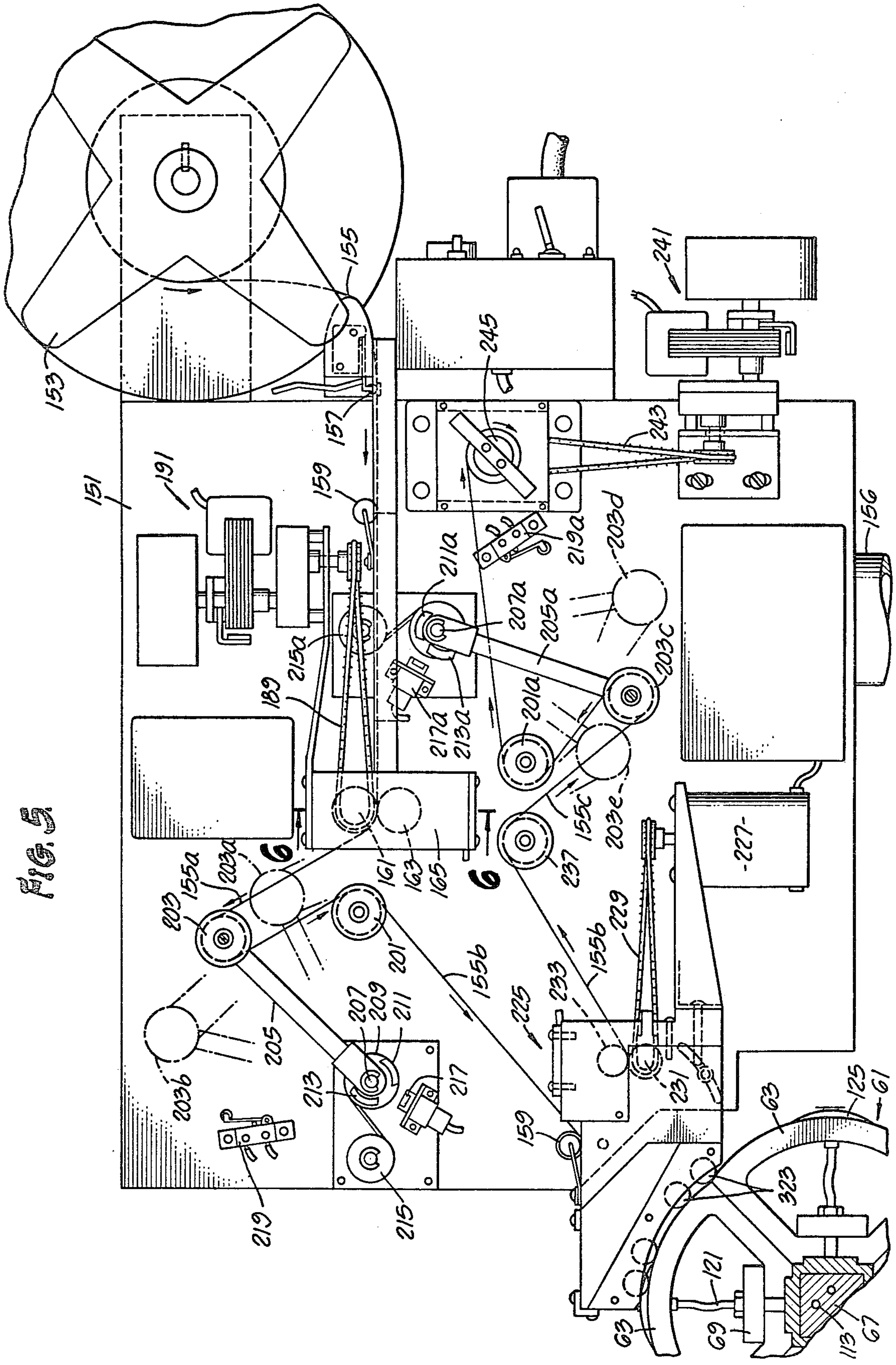
FIG. 5 is a fragmentary side elevational view showing the tape system and control means therefor as employed with the present invention.

Referring now particularly to FIGS. 2 and 3, a sleeve 65 is shown as being fixed to the shaft 55 for rotation therewith, and also being coupled to an axially aligned manifold shaft 67 for unitary rotation therewith. The sleeve 65 has a substantially square opening therethrough and the shafts 55 and 67 are also of square form for so much thereof as is within the sleeve 65. Although any suitable shaft and sleeve shape may be employed, it will be appreciated that the square or rectangular configurations will facilitate the installation of the segmental sections 63 to the sleeve and improve the drivability, without slip. Thus, as shown in FIGS. 3 and 5, each section 63 is fastened to the sleeve 65 by means of a plate or bar 69 and suitable retaining bolts 71. This arrangement not only simplifies mounting of the sections of the wheel, but also improves the ability of each section to flex relative to the sleeve and to each other.

As seen at the right hand portion of FIG. 3, the shaft 67 is rotatably supported by a suitable bearing 75 and terminates at its outer end in a portion of reduced diameter 77 which is rotatably seated within an end socket 79 of a stationary valving member 81. The other end of the valving member is also formed with an end socket 83 which is separated from the end socket 79 by a partition wall 85 containing a valving orifice 87. The end socket 83 at its outer end is connected with an end of a pipe 89 by a connection plug 91 of plastic or other suitable material, this plug being secured as by retaining screws 93. The inner end of the plug 91 is spaced from the bottom of the socket 83 and cooperates therewith to form a chamber 95 having communication with the valving orifice 87 and the pipe 89. A U-shaped strap 91 has its leg portions secured to the frame 57, as illustrated in FIG. 1, and at its bridging portion is provided with clamping means 93 which may be actuated in a well known manner as by a clamping bolt 95 to grip and hold the pipe 89 in fixed position.

As illustrated in FIG. 1, the pipe 89 is arranged for connection with a vacuum system so as to continuously maintain a fluid suction in the chamber 95 in communication with the valving orifice 87. As shown in FIG. 4, the valving orifice 87 is shaped to provide a flow channel having a transverse configuration similar to a "comma" and progressively decreases from a large flow area at one end to a minimum flow area at the other end. On the other side of the partition wall 85, the manifold shaft 67 is formed to provide a plurality of circumferentially spaced bores 113 which successively communicate with the orifice 87 as the shaft 67 is rotated in the direction indicated by the arrows in FIG. 4. As can be seen, the flow through each bore 113 will vary from a maximum, when in registration with the large end of the orifice 87, and decrease gradually to a minimum as it moves to the small end, and is finally cut off by movement out of registration.

As best shown in FIGS. 3, 10 and 15, each bore 113 connects with a radially oriented flexible conduit 121 that leads to a suction cup 127 mounted in the central area of an upraised pressure pad or protuberance 125 at the periphery of each segmental section 63. The suction cup 127 is formed with a very thin, pliable lip 128. For a purpose to be explained later, a groove or recess 129 is formed to extend about the suction cup lip.

From a consideration of FIGS. 2–4 and 15, it will be realized that as the label transfer wheel rotates, the sections 63 will be carried successively through a point vertically positioned above the axis of rotation of the manifold shaft 67, and that at this point the suction cups 127 of each section will be placed initially in communication with the vacuum source via the radial conduit 121, the associated axial bore 113, the valving orifice 87, and the pipe 89. As the transfer wheel 61 continues its rotation in a clockwise direction, as viewed in FIG. 2, suction will continue to be applied to the suction cup in a gradually decreasing amount, as determined by the narrowing of the width of the orifice 87, until the suction cup reaches a point vertically positioned directly below the axis of rotation of the manifold shaft 67. As the wheel rotation carries the suction cup through this lower point the suction will be cut off entirely and remain cut off until the suction cup again reaches the upper point.

As shown in FIGS. 1 and 2, the apparatus further includes a mechanism for successively supplying the required labels from a suitable label source in a manner which will permit their being successively picked up by the suction cups 127 on the label transfer wheel 61 at the previously mentioned upper point and carried to the lower point, where they are successively applied to the objects as they arrive on the conveyor.

The mechanism for supplying the labels is contained within a suitable housing 151 which is positioned in a location generally above that of the associated transfer wheel 61 and the conveyor 21. Preferably, the housing 151 is supported so that its operating position with respect to the transfer wheel 61 can be variably adjusted as to alignment and spacing. For such purpose, as shown in FIG. 1, the housing 151 is supported at one end of a horizontally extending arm 150 by suitable conventional vertically movable means 152 which can be adjusted by an operating crank 154. The arm 150 is suitably supported for axial adjustment at the upper end of a rotatably mounted post support 156 which can be releasably held in an adjusted position by a suitable clamp 158.

More specifically, as shown in FIG. 5, the housing 151 mounts a tape supply reel 153 for a label carrying web or tape 155. Preferably, the tape is pre-treated to releasably affix a plurality of labels 170 thereto, each of said labels having a printed surface on the side thereof away from the tape and an adhesive bonding surface on the side thereof in engagement with the tape. The affixed labels will adhere to the tape until they are peeled off, but the adherence will be relatively light so that peeling can be easily accomplished.

As shown, the tape is moved past a suitable microswitch 157 which may be utilized for stopping the apparatus by providing a stop signal when the end of the tape is withdrawn from the reel 153. Also, as illustrated, suitable locating and/or tensioning rollers 159 are operatively associated with the tape 155.

The tape is withdrawn from the supply reel 153 by a pair of pinch rollers 161 and 163 rotatably mounted within a subhousing 165. As shown in FIG. 6, the roller 161 is formed with a knurled surface, while the roller 163 has a relatively smooth surface. Within the housing 165, the roller 163 is mounted within a carrier 173 which is supported for guided movement towards the roller 161 in opposition to a biasing force produced by a plurality of compression springs 175. The springs 175 may be positioned at various locations (such as the four illustrated in FIGS. 6 and 7) between the carrier 173 and portions of the housing 165 in which the roller 161 is rotatably mounted. The carrier 173 is arranged to be actuated toward the roller 161 by means of a manually operable cam lever 179. Thus, when it is desired to thread the tape 155 between the rollers, the cam lever 179 may be rotated in a clockwise direction, as viewed in FIG. 7, allowing the rollers to be separated slightly by the action of the springs 175 so that the tape can be easily threaded between them. Then, the cam lever 179 may be rotated back to the position illustrated so as to bias the rollers toward one another. As seen in FIG. 6, the cam lever 179 may be biased toward a predetermined position relative to the carrier 173 by means of a spring 181 which may be coaxially located on the shaft upon which the can level 179 is rotatably mounted.

The roller 161 may be mounted for rotation with or relative to a shaft 183 within the housing 165. The roller may be fixed to a drive sprocket 185 for rotation by means of a toothed drive belt 189, as illustrated in FIG. 5, driven by a suitable driving motor 191. Thus, when the motor 191 is energized, the rollers 161 and 163 will draw the tape 155 from the reel 153, and as the tape passes between the rollers, the knurled surface of the roller 161 will impress a crisscross pattern on the printed surface or face of each label 170, as illustrated in FIG. 9, which will enable the label to more easily adhere to an uneven or curved surface. Upon leaving the pinch rollers 161 and 163, the tape is carried through an adjustable feed storage loop **155*a* extending between the roller 161 and a fixed roller 201. The size of the loop may be varied by means of a roller 203 rotatably mounted at the outer end of a tape tension regulating arm 205 which is arranged to swing between predetermined angular locations about an axle 207. The arm 205 is fixed to a disc 209 upon which a pair of magnets 211 and 213** are mounted.

The arm 205 is biased for movement in a counterclockwise direction about axle 207, as seen in FIG. 5, by means of a conventional constant tension spring 215. A sensing device 217 is operably associated with the disc 209 for selective actuation by the magnets 211 and 213 to generate start and stop signals, respectively, for the control of the motor 191. As thus arranged, when sufficient tape is drawn from the feed storage loop **155*a* to swing the roller 203 to the position as shown in phantom lines at 203*a*, the magnet 111 will activate the sensing device 217 to start the motor 191 so as to drive the pinch rollers 161 and 163 and feed additional tape into the storage loop until the roller 203 moves to the phantom line position 203*b*, under the force of the constant tension spring 215, whereupon the magnet 213 will activate the sensing device 217 to stop the motor 191** and discontinue the further feeding of tape to the storage loop until the stored supply is again depleted.

A safety feature is provided to stop the operation of the apparatus in the event the tape should break, and for this purpose a detector 219 in the form of a microswitch, as shown in FIG. 5, is positioned in the path of movement of the arm 205 where it will be operated thereby if the arm is permitted to swing beyond the roller position **203*b*.**

As the tape passes the idler roller 201, it enters the central indexing loop **155*b*, during which time it is carried through an indexing or transfer head 225, wherein the labels are stripped from the tape and transferred to the label transfer wheel 61** in a manner which will be described presently.

The indexing loop **155*b* of the tape travel path is the central dynamic portion of the tape system, and it is in this part of the tape system that it is extremely important to maintain as low a tension on the tape as possible, to maintain the tension at a constant value, and to present the tape to the label transfer station under a practically inertia-free condition so that it can be accelerated very rapidly. In this manner, the tape can be stepped or indexed to provide the necessary start-and-stop operations in the tape movement to properly transfer the labels at the proper moment. This indexing movement of the tape is accomplished by means of a driving stepper motor 227 which is connected by a toothed belt 229 to drivingly rotate a pair of pinch rollers 231 and 233 between which the tape passes. These rollers may be provided with cam means similar to that illustrated in FIG. 7 for the release of the rollers 161 and 163** to facilitate threading the tape therebetween.

As the tape leaves the central indexing loop it is carried over an idler roller 237, and then enters a take-up storage loop **155*c* formed between the roller 237 and an idler roller 201*a*. The loop size is controlled by a roller 203*c* mounted at the outer end of a tape tension regulating arm 205*a*, which may be biased for swinging movement in a counterclockwise direction, as viewed in FIG. 5, about an axle 207*a* by means of a conventional constant tension spring 215*a*. Magnets 211*a* and 213*a* in this case selectively control a sensing device 217*a* in a manner such that, when the roller reaches the position 203*d*, the magnet 211*a* activates the sensor so as to energize a drive motor 241. This motor is drivingly connected by a toothed belt 243 with a take-up spool of reel 245 for drawing tape from the loop 155*c*. Similarly, when the roller reaches the position 203*e*, the magnet 213*a* will activate the sensing device 217*a* to stop the drive motor 241, thereby terminating the rotation of the take-up reel 245. The indexing motor 227 continues to pull the tape from the central indexing loop 155*b* into the take-up loop 155*c*, and as a consequence arm 205*a* will again move until the roller reaches the position 203*d*, whereupon the take-up operation will begin again. As in the case of the feed storage loop 155*a*, a detector 219*a* is provided to stop the operation of the apparatus in the event of tape breakage in the loop 155*c*.**

Thus, as illustrated in FIG. 5, the tape is moved through the central dynamic loop **155*b* with a constant low tension and minimum inertia. As the tape is used in the central indexing loop 155*b*, the size of the feed storage loop 155*a* decreases and the size of the take-up storage loop 155*c* increases. The sensors associated with each of these loops maintain their respective drive units in the off positions until the arms 205 and 205*a* reach the position in which the sensors 217 and 217*a* are actuated by their respective magnets. At that point, the drive motors 191 and 241 are controlled to increase the size of the feed storage loop 155*a* and decrease the size of the take-up storage loop 155*c*** in the manner described previously. When these loops are at their maximum and minimum values, respectively, the magnets cooperate with the sensors to shut off the drive motors. Of course, it will be appreciated that these operations with respect to the two tension regulating arms need not always occur simultaneously and there is no necessity that such simultaneous operation be accomplished.

Although not specifically shown, it is preferable that each of the drive motors 191 and 241 includes an associated brake of either electrical or mechanical type so that starting and stopping of the movements of the arms 205 and **205*a*** will be substantially instantaneous with the actuation of their respective sensors.

Referring more particularly to FIGS. 10-14, the mechanism for transferring a label from the tape 155 will now be described. As discussed previously, an indexing or transfer head 225 is located within the central indexing loop 155*b* of the tape in such a manner that the tape passes therethrough at a location closely adjacent the periphery of the label transfer wheel 61.

More specifically, the indexing head 225 comprises a housing 301 through which the tape of the loop 155*b* passes along a predetermined guide path as shown in FIGS. 10 and 14. The tape is moved past a suitable label detector which will sense the presence of the label. For example, the tape may be passed between a light beam emitter 303 and a photocell 305, as illustrated. The label detector may also be of the retroreflective type in which the light beam emitter and the photocell would be positioned on the same side of the tape. It will be appreciated, of course, that if the label detector employs the broken light beam principle the tape should be translucent. On the other hand, if the reflective principle is utilized, it is imperative that the tape be non-reflective.

After passing the label detector, the tape is moved forwardly around a sharp bend 309. As the tape traverses the bend, each label will attempt to maintain its integrity and will be peeled from the tape at its leading edge and continues on into a label holding frame 311 mounted within a surface 313.

The purpose of the previously mentioned fruit detector 33 and the label detectors 303, 305 with their associated control is to assure that for each detected fruit a label will be indexed into the holding frame 311 so as to be picked up by the transfer wheel 61 and applied to the detected fruit upon arrival at the labeling station.

The indexing operation is initiated by the fruit detector 33, which is activated by the detected fruit to produce an "on" signal to cause the motor 227 to drive the rollers 231 and 233 to advance the tape and move the detected label. By suitable control which permits the motor 227 to run for a preprogrammed length of time after the detected label has passed by the label detector, the amount of detached portion of the label to be placed in the holding frame 311 can be precisely determined and controlled irrespective of a missing label, irregularities in the label spacings, etc.

In the event a label is missing, or a label has not been detected, the indexing operation will continue until a label is delivered to the holding frame 311 for the particular detected fruit. Also, in the event that a fruit is missing on the conveyor, the fruit detector will not be activated and, as a consequence, no label will in this case be delivered to the holding frame 311.

As shown in FIG. 11, the surface 313 is formed on the undersides of a pair of supports 315 and 317 which are separated by a channel 319 in which the frame 311 is located. Moreover, the surface 313 is longitudinally of radial concave form about the axis of the vacuum transfer wheel 61. A plurality of axially spaced parallel rollers 321 are mounted in the support 315 and a like plurality of rollers 323 are mounted in the support 317, with portions of their outer surfaces projecting outwardly beyond the surface 313. Preferably, the rollers on one side of the channel 319 are respectively coaxially aligned with the rollers on the opposite side of the channel.

As part of the indexing block, these rollers serve to form dynamic stabilizing means for the vacuum transfer wheel 61 which may rotate and accelerate at high velocities. The rollers, which may be of Teflon or other similar material, allow smooth travel of the lateral peripheral surfaces of the segmental sections 63 as they pass through the transfer station formed by the indexing block 225. Since the sections 63 are preferably relatively flexible, so that they may be employed to firmly apply the labels to objects of varied sizes, and since the wheel will rotate at relatively high speed during operation, it becomes necessary to provide structure means which will stabilize the dynamic behavior of the wheel sections, particularly during the transfer of the label from the frame 311 to the transfer wheel 61. For this purpose, the rollers 321 and 323 are located to cooperate with the peripheral lateral surfaces of the segmental sections 63, as shown in FIG. 11. Thus, the protuberance 125 of each section 63, which carries the suction cup 127, will be permitted to pass through the channel 319 in the indexing head in a stabilized fashion.

As the label 170 is stripped from the tape segment 155*b*, it will enter the label holding frame 311 in the manner shown in FIGS. 10-12. More specifically, the frame 311 is shown as comprising a base portion 331 which may be adjustably fastened at one end within the channel 319 as by means of the end slots 330 and screws 332. At the other end, a pair of frame arms 333 are formed to include laterally spaced extensions 331*a* of the base portion 331 in such a manner that the arms are flexibly mounted on the indexing head. As shown in FIG. 11*a*, each extension 331*a* may be provided with an overlying section 341 which cooperates therewith to form a guide channel 342 with an inner side opening 343 for the reception of an edge margin of a label received in the frame holder. Preferably, the overlying section 341 is of Teflon or other suitable material which will not adhere to the adhesive on the labels. When a label is deposited in the holding frame 333, its trailing end preferably remains loosely attached to the tape segment 155*b* when tape movement is stopped, while the side edges of the printed surface of the label will be in contact with the arm extensions 331*a*. Thus, as viewed in FIGS. 10 and 11, the adhesive surface of the label faces away from the transfer wheel 61 and the printed surface is located close to the wheel periphery.

In the preferred embodiment, the natural angle of inclination of the arm extensions 331*a* relative to the portion of the base 331 fixed to the indexing block, is approximately 15° downwardly as shown at 331*a* in FIG. 10. In other words, considering a line tangent to the periphery of the vacuum transfer wheel 61, the arms 333 extend approximately 15° below the tangent or closer to the axis of the wheel. As the wheel rotates, the protuberances push against the arms, lifting them until they are in a plane substantially tangent to the periphery of the protuberance as shown in FIG. 10.

As the rubber section 63 passes under the label holding frame 311, the elastic characteristics of the steel allow the arms 333 and the label being held therein to be deflected from the position 311*a* to the position 311. Once the suction cup 127 of the protuberance or pressure pad 125 reaches a position under the label in the holding frame, the valving orifice 87 operates to connect the suction cup with the vacuum source, whereupon the vacuum cup grips the label and withdraws it from the holding frame as the transfer wheel continues to rotate. Continued rotation of the transfer wheel 61 will carry the pressure pad 125 into a position of contact with the previously detected object or fruit on the conveyor. As the synchronized contact movement of the pad and fruit continues, the pad 125 will be deformed with the label around the fruit, as shown in FIGS. 15 and 16, exerting a normalizing pressure on the surface of the fruit and causing the label to adhere to the fruit surface through the adhesion of the pressure sensitive adhesive thereon. The orifice valve 87 now functions to gradually reduce and cut off the vacuum applied to the suction cup as the fruit and pressure pad 125 begin to move apart. During application of the label, the lip 128 of the suction cup will be deformed into the groove 129 surrounding it, as illustrated particularly in FIG. 16, causing the lip to separate from the label and relieve any vacuum which might be remaining in the suction cup. In this manner, the label is uniformly bonded to the fruit surface with little or no wrinkling. It will be apparent also, that the deformation of the pressure pad 125 will cause the label 170 to be pressed against the fruit substantially throughout its entire surface so as to provide total adhesion of the label to the fruit.

The operation will now be described with particular reference to FIG. 17. Prior to the starting of a production run, the apparatus will be provided with a supply of label bearing tape 155 which is properly threaded from the supply reel 153 through the storage loop, the indexing head, and the take-up loop back to the take-up reel 245, as shown in FIG. 5.

With the apparatus turned on, the conveyor 21 will now operate to successively advance the objects or fruit to the labeling station 37, and as each fruit approaches the labeling station, the fruit detector 33 will produce an "on" control signal which will be operative through a master relay 401 to energize the stepping motor 227 which will then drive the pinch rollers 231 and 233 to draw the tape through the indexing head 225. A label 170 is delivered into the holding frame 311 for subsequent application to the particular detected fruit.

As the conveyor continues to carry the detected fruit towards the labeling station 37, the synchronized rotation of the vacuum transfer wheel 61 will carry the pressure pad 125 into a position in which the suction cup 127 will engage the exposed printed side of the label. At this point, a vacuum source is connected with the suction cup which then firmly grips and holds the label so that upon continued rotation of the transfer wheel, the label will be withdrawn from the holding frame as it is carried to the labeling station for application to the surface of the detected fruit.

In the labeling station, the pressure pad will engage the outer surface of the fruit, and as the pad and fruit are synchronously moved, the pressure pad 125 will be deformed so as to firmly press the adherent side of the label against the fruit. At this point of rotation of the transfer wheel, the vacuum control will disconnect the suction cup. Simultaneously, the deformation of the pressure pad acts to deform the lip of the suction cup in such a manner that any vacuum remaining in the suction cup will be relieved with respect to the associated label. The labeled fruit is then discharged from the conveyor into the receiving trough 39. As the apparatus continues to operate, labels will be applied according to the disclosed method in a similar manner to each detected fruit.

Various modifications may suggest themselves to those skilled in the art without departing from the spirit of the invention described herein, and hence, there is no wish to be restricted to the specific form shown or uses mentioned, except to the extent indicated in the appended claims.

We claim:

1. The method of successively applying labels to a series of objects as they are delivered to a labeling station, which comprises the steps of:

- intermittently moving a carrier tape with indexing movements to successively present labels adhesively affixed thereon at the labeling station;
- successively stripping the labels from the tape and positioning them in a frame holder with their adhesive surfaces upwardly disposed;
- successively conveying objects to be labeled to the labeling station; and
- pneumatically successively gripping the detached labels in said frame holder and bodily moving them one-by-one from said frame holder to the labeling station with their adherent surface facing downwardly and into surface engagement with the objects as they arrive at the labeling station.

2. The method according to claim 1, which includes the step of impressing the non-adherent surface of the label on the carrier tape with a surface tension relieving pattern prior to its being stripped from the tape so as to facilitate the conformance of the detached label to an object having a curved surface.

3. The method according to claim 1, which includes the step of:

- independently maintaining the tape feed and take-up under constant, low tension and low inertia conditions to enable high speed acceleration and deceleration of the tape during said indexing movements.

4. The method according to claim 1, which includes the steps of:

- feeding the tape into a regulating constant spring tensioned feed storage loop prior to said indexing movements;
- feeding the tape into a regulating constant spring tensioned take-up loop after said indexing movements; and
- utilizing the indexing movements of the tape to transfer the tape from the feed storage loop to the take-up loop.

5. The method according to claim 1, wherein said step of pneumatically successively gripping the label includes:

- engaging the label in the frame holder by means of a single flexible suction cup;
- creating a suction force within the suction cup to grip the label; and
- thereafter gradually decreasing the suction force to a point of termination as the label is applied to the object.

6. The method according to claim 5, in which the suction cup is deformed, as the label is applied to the object, to relieve any remaining residual suction force therein.

7. The method according to claim 1, which includes the step of resiliently applying a pressure in surrounding relation to the pneumatically gripped area of the label to conform the label to the facing surface of the object.

* * * * *